Patented Dec. 4, 1934

1,982,688

UNITED STATES PATENT OFFICE 1,982,688

PROCESS FOR REVIVIFYING SODIUM BICARBONATE SOLUTION

Robert W. Pack, Beaumont, Tex., assignor to Sun Oil Company, Philadelphia, Pa., a corporation of New Jersey No Drawing. Application December 3, 1931, Serial No. 578,746

1 Claim. (Cl. 23—64)

The present invention relates to a process for revivifying sodium bicarbonate solution which is used as one component of a foam generating mixture for combating oil and chemical fires.

At the present time there is in use a process for combating fires of the above type which consists of mixing two solutions at a point near the flame so as to generate a foam which spreads over the surface of the burning material. One of the solutions used must be an acid solution and is preferably a solution of aluminum sulphate in water; the other solution is sodium bicarbonate in water to which is added a licorice compound or other compounds which will entrain the bubbles of carbon dioxide gas which are formed. As this system is used to combat oil fires, the mixing chamber is positioned just inside the upper rim of the tank. The two solutions are pumped into this mixing chamber and the acid solution reacts with the sodium bicarbonate solution, thereby liberating the carbon dioxide gas and the licorice compound is blown into a foam by the evolved gas and spreads over the surface of the burning liquid in a tenacious layer.

From the foregoing it is evident that large amounts of these two solutions must be kept in storage at a point near the source of the fire hazard. The acid or aluminum sulphate solution can be kept for an indefinite time without deterioration. However, the sodium bicarbonate solution is somewhat unstable, and atmospheric conditions such as summer temperatures cause it to decompose into normal sodium carbonate, carbon dioxide and water as shown by the following equation:

$$2NaHCO_3 = Na_2CO_3 + CO_2 + H_2O$$

It is therefore necessary that the sodium bicarbonate solution be maintained at or near its full strength as the amount of foam generated depends entirely upon the strength of this solution in available carbon dioxide.

The normal strength of the sodium bicarbonate solution is .7# of the salt to 1 gallon of water and a solution of this strength when admixed with the proper amount of acid solution and licorice compound will generate foam to the amount of 8 times its original volume. After the sodium bicarbonate solution has been permitted to stand for some time and decomposition has taken place, it is found to be often no more than 50% as effective as it should be, or in other words, it will form only four volumes of foam.

The object of the present invention is to revivify the sodium bicarbonate solution in an inexpensive and efficient manner without removing the same from storage tanks.

Heretofore this solution has been revivified by pumping the spent solution into the top of a tower filled with broken stoneware or other equivalent material and admitting carbon dioxide gas at the bottom of the tower so that the solution, in percolating over the filling material within the tower, will be more or less dispersed and will combine with the carbon dioxide gas and water to form sodium bicarbonate from the normal sodium carbonate contained therein. The equation showing the reaction is just the reverse of the one given above to illustrate the decomposition.

It is readily seen that the above method is not only unwieldy, but that it also requires the service of several operators and the installation of equipment to carry out the method.

My improved method is such that no special equipment is needed and no extra labor is required to carry it out. I have discovered that if solid carbon dioxide is tightly compressed under 3000# pressure it will have a specific gravity of 1.2 as compared with water at 60° F. Since this is a greater specific gravity than that of the sodium bicarbonate solution, the solid carbon dioxide if added to the bicarbonate solution will drop to the bottom and change slowly into its gaseous state. The carbon dioxide gas, on rising in small bubbles through the solution in the tank, will combine with the partially decomposed solution in exactly the same manner as the carbon dioxide in the tower method just explained.

I have found that 7# of solid carbon dioxide is sufficient to revivify 1 barrel (42 gallons) of bicarbonate solution which has deteriorated 50% in efficiency. In practicing my process the solid carbon dioxide is dropped into the tank of solution at several different points so that the evolved gas comes into contact with an optimum amount of solution.

I have found on calculation that my improved method is much cheaper than the former, or tower method, without considering the expense of providing the equipment necessary for carrying out the tower method. In fact I have determined that 1000 bbls. (42,000 gals.) of solution which has lost 50% of its efficiency can be revivified for $550.00 by the present process whereas the revivification of the same amount by the tower method would entail an expense of $909.00 exclusive of the cost of equipment.

It is also to be noted that the solution, in my improved process is not moved from its storage tank and is immediately available whereas in operating the tower method the solution must be removed from its place of storage.

Instead of permitting the solution to stand until it has deteriorated to a point where its usefulness is impaired, smaller amounts of solid carbon dioxide may be added at short intervals, which would be determined by testing the solution to determine its maximum expansion. The maximum expansion of the sodium bicarbonate solution may be determined by adding to any predetermined amount a like amount of the acid solution, hereinbefore referred to, and measuring the volume of foam generated, or, if desired, the amount of available $CO_2$ in the sodium bicarbonate solution may be determined by quantitative chemical tests which need not be described here as they are well known. The amount of available $CO_2$ in the sodium bicarbonate solution is, of course, a direct indication of the amount of foam which can be generated. The exact intervals at which the solid carbon dioxide should be added can not be correctly stated as the rate of deterioration varies with climatic conditions. Under normal conditions the bicarbonate solution must be revivified about every two years at which time it has deteriorated to about 50% of its foam generating capacity. In view of this it is apparent that the addition of slightly less than 2# of solid carbon dioxde per barrel of solution every six months or one pound every three months would keep the solution at its maximum efficiency.

I claim:

The process of revivifying sodium bicarbonate solution, while in storage, to maintain it continuously in condition for instant use, which comprises determining the amount of deterioration to normal sodium carbonate and adding solid carbon dioxide to the storage vessel containing the solution in an amount sufficient to convert such normal sodium carbonate to sodium bicarbonate.

ROBERT W. PACK.